(12) United States Patent
Rooney

(10) Patent No.: US 10,953,697 B2
(45) Date of Patent: Mar. 23, 2021

(54) TIRE FOR SAND TRACTION

(71) Applicant: The Goodyear Tire & Rubber Company, Akron, OH (US)

(72) Inventor: Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 300 days.

(21) Appl. No.: 16/111,958

(22) Filed: Aug. 24, 2018

(65) Prior Publication Data

US 2020/0062040 A1  Feb. 27, 2020

(51) Int. Cl.
*B60C 11/03* (2006.01)
*B60C 11/01* (2006.01)
*B60C 11/00* (2006.01)

(52) U.S. Cl.
CPC .......... *B60C 11/03* (2013.01); *B60C 11/0083* (2013.01); *B60C 11/01* (2013.01); *B60C 2200/14* (2013.01)

(58) Field of Classification Search
CPC .. B60C 2200/14; B60C 11/03; B60C 2200/08
See application file for complete search history.

(56) References Cited

U.S. PATENT DOCUMENTS

| | | | |
|---|---|---|---|
| 5,016,696 A | 5/1991 | Bonko et al. | ............ B60C 11/08 |
| 5,337,814 A * | 8/1994 | Bonko | ............... B60C 11/1369 152/209.12 |
| 5,337,816 A * | 8/1994 | Bonko | ............... B60C 11/0311 152/209.2 |
| 5,361,816 A | 11/1994 | Hitzky | .................... B60C 11/11 |
| 5,580,404 A | 12/1996 | Hitzky | .................... B60C 11/12 |
| 6,142,201 A | 11/2000 | Harms | ...................... B60C 3/06 |
| 2004/0123926 A1* | 7/2004 | Rooney | ............. B60C 11/0316 152/209.12 |
| 2005/0173036 A1* | 8/2005 | Rossignaud | ........ B60C 11/0311 152/209.11 |
| 2014/0083581 A1* | 3/2014 | Schaedler | ................. B60B 9/26 152/5 |
| 2016/0288578 A1* | 10/2016 | Harms | ...................... B60C 3/06 |
| 2020/0156414 A1* | 5/2020 | Gasc | .................... B60C 11/0311 |

FOREIGN PATENT DOCUMENTS

GB  505994 A * 5/1939 .......... B60C 11/0311

* cited by examiner

*Primary Examiner* — Robert C Dye
*Assistant Examiner* — Farah Taufiq
(74) *Attorney, Agent, or Firm* — Edward T. Kennedy

(57) ABSTRACT

A tire for sand traction includes a ground-engaging tread that is disposed radially outwardly of a wheel. Structural elements extend radially between the wheel and the tread. The tread includes an inboard shoulder and an outboard shoulder. The tread is formed with a recess wall that extends laterally between the inboard shoulder and the outboard shoulder. The recess wall is disposed radially inwardly of the inboard shoulder and the outboard shoulder to form a central recess. The tire also includes a plurality of circumferentially-spaced, laterally-extending lugs. Each lug extends across the central recess from the inboard shoulder to the outboard shoulder.

19 Claims, 3 Drawing Sheets

TIRE FOR SAND TRACTION

FIELD OF THE INVENTION

The invention relates to pneumatic and non-pneumatic tires and treads of such tires. More particularly, the invention is directed to a tire that includes a tread formed with structural features for travel on sand and other surfaces.

BACKGROUND OF THE INVENTION

A tire includes structural elements that extend radially outwardly from a wheel or a hub to a ground-engaging tread. When the tire is a pneumatic tire, the structural elements are sidewalls, which cooperate with the tread and wheel or hub to form a cavity that is inflated with pressurized air. When the tire is a non-pneumatic tire, the structural elements typically include a system of spokes or webbing which support the tread without the use of pressurized air.

Whether the tire is pneumatic or non-pneumatic, it is known that structural aspects of the tread of the tire affect vehicle performance. For example, a tread may be formed with specific grooves or features to increase traction or to promote fuel efficiency. The structural aspects of the tread become even more important when the vehicle is to travel over specific types of off-road surfaces, such as sand.

In order for a tire to develop traction in sand, it is desirable for the tread to take advantage of the frictional and shear properties of the sand and to resist sinking into the sand while developing thrust. Based on these requirements, a tire with a tread that will perform well in sand should stay on top of the sand and either roll on the surface of the sand or paddle through the sand.

To remain on the top of the sand and roll on the surface or paddle through it, prior art tires 10 have been developed with a tread 12 that includes lugs 16 which are very thin and widely spaced apart and a smooth surface 14 between the lugs, as shown by way of example in FIG. 1. Although such prior art tires 10 typically work well in the sand, the thin, widely-spaced lugs 16 and the smooth surface 14 between the lugs of the tread 12 provide less-than-optimum wear, traction, stability and/or handling on other surfaces.

More particularly, even when a tire is developed for use on a particular surface, such as sand, the tire often has to travel over multiple other surfaces throughout its life. For example, a tire for sand may have to travel over compressed dirt, rock, asphalt, concrete or other dense, hard surfaces before or after traveling over sand. Thus, when a tire that may perform well on sand provides less-than-optimum wear, traction, stability and/or handling on other surfaces, the tire may be undesirable.

As a result, there is a need in the art for a tire that includes a tread formed with structural features that enable optimum travel on sand and other surfaces.

SUMMARY OF THE INVENTION

According to an aspect of an exemplary embodiment of the invention, a tire for sand traction includes a ground-engaging tread that is disposed radially outwardly of a wheel. Structural elements extend radially between the wheel and the tread. The tread includes an inboard shoulder and an outboard shoulder. The tread is formed with a recess wall that extends laterally between the inboard shoulder and the outboard shoulder, in which the recess wall is disposed radially inwardly of the inboard shoulder and the outboard shoulder, to form a central recess. Each lug of a plurality of circumferentially-spaced laterally-extending lugs extends across the central recess from the inboard shoulder to the outboard shoulder.

Definitions

The following definitions are applicable to the present invention.

"Axial" and "axially" mean lines or directions that are parallel to the axis of rotation of the tire.

"Circumferential" means lines or directions extending along the perimeter of the surface of the annular tread perpendicular to the axial direction.

"Equatorial plane" means the plane perpendicular to the axis of rotation of the tire and passing through the center of the tire tread.

"Footprint" means the contact patch or area of contact created by the tire tread with a flat surface as the tire rotates or rolls.

"Groove" means an elongated void area in a tread that may extend circumferentially or laterally about the tread in a straight, curved, or zigzag manner.

"Inboard side" means the side of the tire nearest the vehicle when the tire is mounted on a wheel and the wheel is mounted on the vehicle.

"Inner" means toward the inside of the tire.

"Lateral" and "laterally" are used to indicate axial directions across the tread of the tire.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Outer" means toward the outside of the tire.

"Radial" and "radially" are used to mean directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means a small elongated opening in the tread that improves traction characteristics.

"Tread" means a molded rubber component which includes that portion of the tire that comes into contact with the road when the tire is under normal load.

"Tread element" or "traction element" means a rib or a block element having a shape defined by adjacent grooves or sipes.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
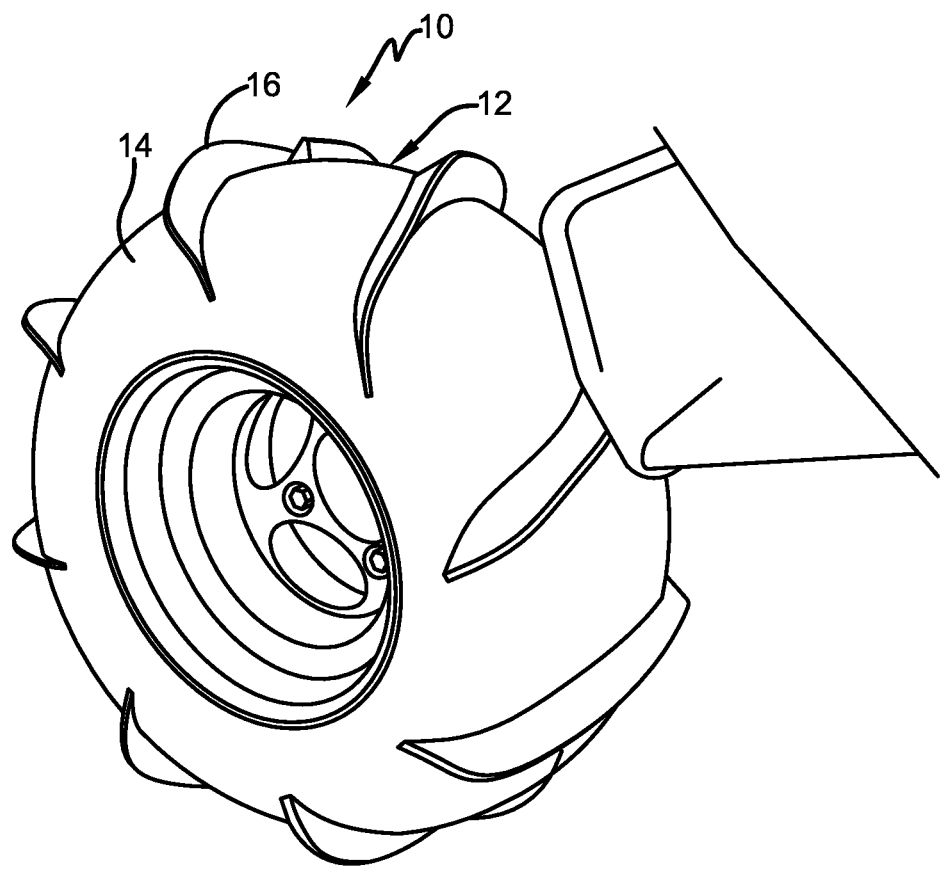
FIG. 1 is a perspective view of an exemplary tire of the prior art.
Figure 2:
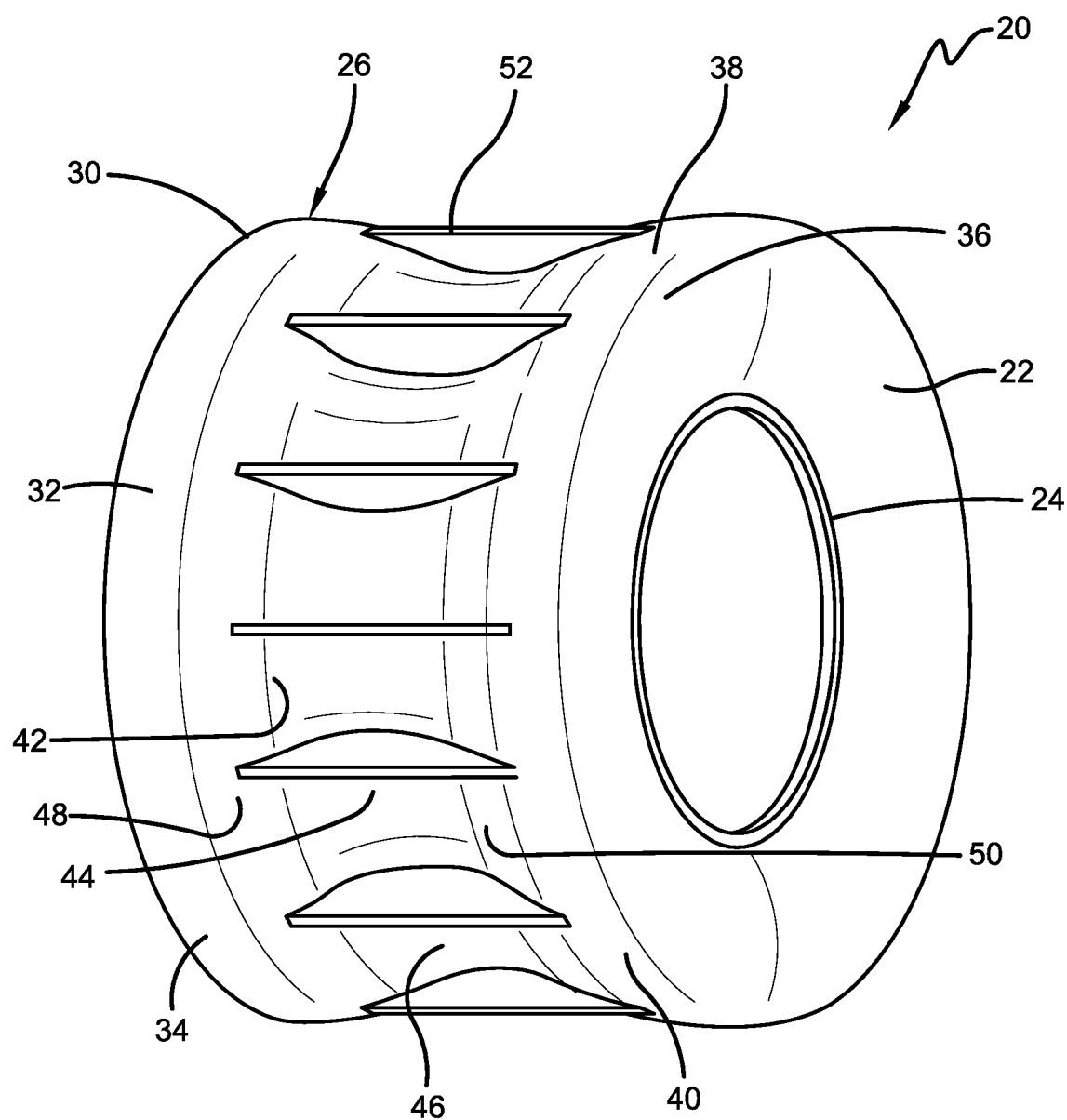
FIG. 2 is a perspective view of an exemplary embodiment of a tire of the present invention.
Figure 3:
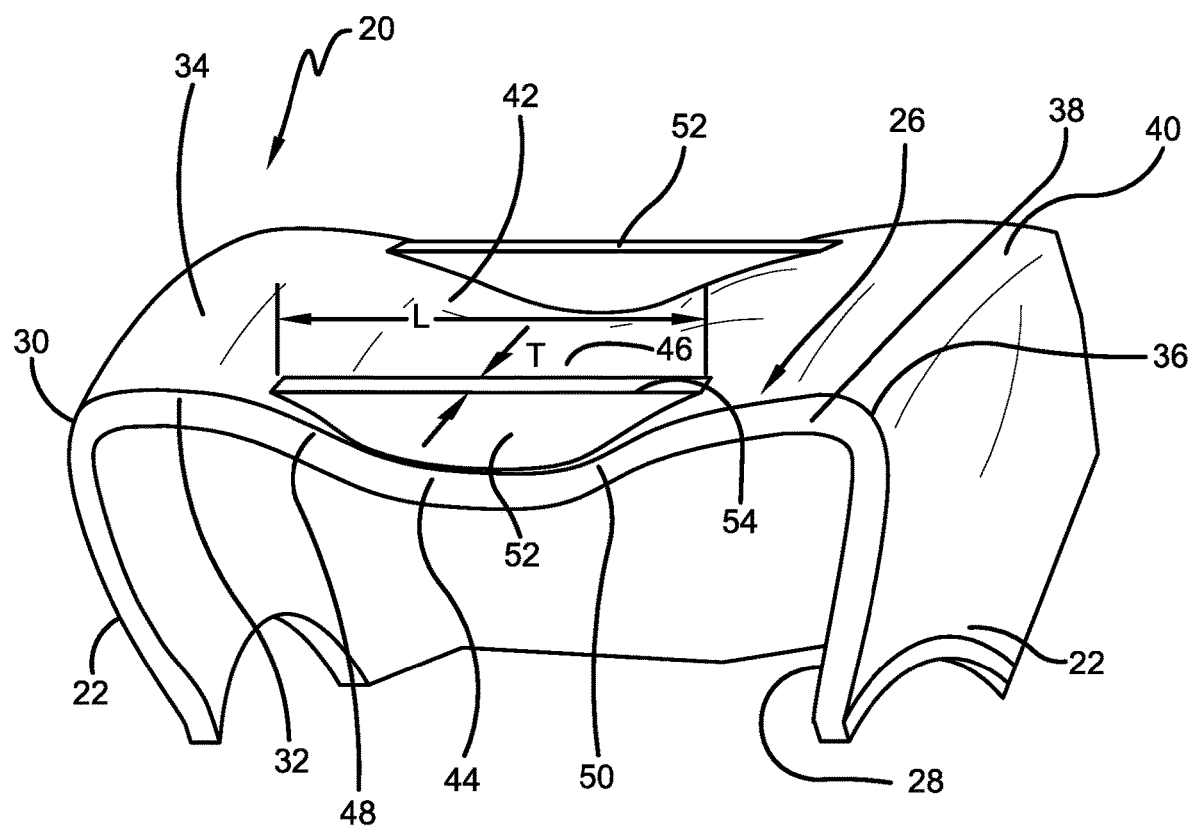
FIG. 3 is a cross-sectional view of the tire shown in FIG. 2.

Turning to FIGS. 2 and 3, an exemplary embodiment of a tire of the present invention is indicated generally at 20.

The tire 20 includes a pair of structural elements 22 that extend radially outwardly from a wheel or hub 24 to a ground-engaging tread 26. The wheel or hub 24, which is not part of the tire 20 and shall be referred to herein as a wheel for the purpose of convenience, defines the axis of rotation of the tire 20. When the tire 20 is a pneumatic tire, the structural elements 22 are sidewalls, which cooperate with the tread 26 and the wheel 24 to form a cavity 28 that is inflated with pressurized air. When the tire 20 is a non-pneumatic tire, the structural elements include a system of spokes or webbing as known to those skilled in the art that support the tread 26 without the use of pressurized air.

The tread 26 is formed with structural features that enable optimum travel of the tire 20 on sand and other surfaces. More particularly, the tread 26 includes an inboard side 30 at which an inboard shoulder 32 is formed. The inboard shoulder 32 extends laterally and tapers radially inwardly as it extends in an outboard direction. An exemplary angle of the taper is from about one degree to about 10 degrees, and preferably about five degrees. The tread 26 also includes an outboard side 36 at which an outboard shoulder 38 is formed. The outboard shoulder 38 extends laterally and tapers radially inwardly as it extends in an inboard direction. An exemplary angle of the taper is from about one degree to about 10 degrees, and preferably about five degrees.

The inboard shoulder 32 preferably is formed with a smooth radially outer surface 34, and the outboard shoulder 38 preferably is formed with a smooth radially outer surface 40. The inboard shoulder 32 and the outboard shoulder 38 preferably extend radially equidistant and generally laterally parallel to one another taking into account their respective tapers.

The tread 26 also includes a central recess 42 formed by a recess wall 44 extending between the inboard shoulder 32 and the outboard shoulder 38. The recess wall 44 is disposed radially inwardly of, and extends laterally parallel to, the surface 34 of the inboard shoulder 32 and the surface 40 of the outboard shoulder 38. The recess wall 44 preferably is formed with a smooth surface 46.

An inboard transition 48 is formed between the inboard shoulder 32 and the recess wall 44. The inboard transition 48 preferably is formed with a large radius that provides a gentle curve from the inboard shoulder 32 to the recess wall 44, which enables structural stability and strength of the tread 20. An outboard transition 50 is formed between the outboard shoulder 38 and the recess wall 44. The outboard transition 50 preferably is also formed with a large radius that provides a gentle curve from the outboard shoulder 38 to the recess wall 44, which enables structural stability and strength of the tread 20. Preferably, the radius of the inboard transition 48 is equal to the radius of the outboard transition 50.

Extending across the central recess 42 is a plurality of laterally-extending lugs 52. More particularly, each lug 52 extends across the central recess 42 from the inboard shoulder 32 to the outboard shoulder 38 for a distance or length L. The lugs 52 are integrally formed with and are supported by the inboard shoulder 32, the outboard shoulder 38 and the recess wall 44. Each lug 52 includes a radially outer surface 54 that is disposed radially inwardly of the surface 34 of the inboard shoulder 32 and the surface 40 of the outboard shoulder 38. In this manner, the respective surfaces 34 and 40 of the shoulders 32 and 38 are the ground-engaging surfaces for hard or dense ground.

Each lug 52 preferably is formed with a taper as it extends radially outwardly, being thicker at the recess wall 44 and thinner at the radially outer surface 54. By way of example, each lug 52 may be formed with a thickness T at its radially outer surface 54 that is about one-quarter of an inch, widening to a thickness of about one-half of an inch at the recess wall 44. In addition, each lug 52 may include a straight lateral configuration, thereby forming a straight line as it extends laterally. Alternatively, each lug may include a curved lateral configuration, thereby forming a cupped shape as it extends laterally. Preferably, the maximum radial height of each lug 52, which is the maximum radial distance from the recess wall 44 to the lug radially outer surface 54, is from about one inch to about three inches, depending on the size of the tire 20 and particular design considerations.

The lugs 52 are spaced apart circumferentially about the tire 20, preferably with even spacing about the tire. The specific number of the lugs 52 and the spacing between them are based upon the size of the tire 20 and particular design considerations. More particularly, the spacing between the lugs 52, which in turn may determine the number of lugs to be employed, may be optimized based on the internal angle of friction of the sand on which the tire 20 is to travel in order to maximize shear. By way of example, in order to enable the tire 20 to generate optimum pressure and thrust based on the internal angle of friction of the sand, the lugs 52 may be spaced from about three inches to about ten inches apart.

The tire 20 of the invention thus includes a tread 26 formed with structural features that enable optimum travel on sand, and which provide optimum wear, traction, stability and/or handling on other surfaces.

For travel on sand, the large, smooth surface areas of each shoulder 32 and 38 and the recess wall 44 prevent the tire 20 from sinking into the sand. The structural features of the tire 20 of the present invention provide a general shape for the tread 26 that is concave, which confines or traps sand, applies pressure, and then shears the trapped sand to supply forward locomotion. More particularly, the radial inward taper of each shoulder 32 and 38, combined with the respective inboard and outboard transitions 48 and 50 and the recess 42, confine or trap the sand on the inside of the footprint area of the tire 20 and move the sand toward the tire center and thus the lugs 52. Such trapping and movement of sand enables the center area of the footprint, including the recess wall 44 and the lugs 52, to apply pressure and compress the trapped sand. The structure of the tread 26 also enables sand to be trapped between the surfaces of the lugs 52 to further increase the pressure that is applied to the sand. The lugs 52 then shear the compressed sand to create thrust and thus locomotion for the tire 20 and thus the vehicle.

For travel on other surfaces, such as compressed dirt, rock, asphalt and/or concrete, the smooth shoulders 32 and 38 of the tire 20 extend radially past the lugs 52. Because the lugs 52 do not extend past the higher outer-diameter shoulders 32 and 38, the wear experienced by the lugs is reduced. In addition, because the shoulders 32 and 38 extend radially outwardly of the lugs 52 and thus bear the load instead of the lugs, the wear, traction, stability and handling characteristics of the sand-traction tire 20 on hard or dense surfaces are optimized.

An additional feature that may be incorporated into the tire 20 is a steer feature such as one or more ribs that extend circumferentially about the tread 26. Such circumferentially-extending ribs may be formed on the recess wall 44 to be disposed in the central recess 42. The circumferentially-extending ribs may be disposed in the central recess 42 in place of the lugs 52 or in addition to the lugs. To enable optimum travel, the circumferentially-extending ribs preferably do not extend radially past the shoulders 32 and 38.

The tire 20 of the present invention finds application on any vehicle that has a high percentage of sand applications, such as deserts, dunes, beaches, the moon, mars, or other environments. As described above, the tire 20 enables optimum sand traction and use on other surfaces that may be more densely packed or compressed than sand.

The present invention also includes a method of forming a tire 20 that includes the features described herein, and a method of using a tire that includes the features described herein. Each method includes steps in accordance with the description that is presented above and shown in FIGS. 2 and 3.

It is to be understood that the structure of the above-described tire may be altered or rearranged, or components or steps known to those skilled in the art omitted or added, without affecting the overall concept or operation of the invention. For example, the tire 20 can be either pneumatic or non-pneumatic, or used on surfaces other than those described herein, without affecting the overall concept or operation of the invention. In addition, features such as grooves, ribs or other elements may be added to the shoulder surfaces 32 and 38, or to the recess wall 44, without affecting the overall concept or operation of the invention.

The invention has been described with reference to a preferred embodiment. Potential modifications and alterations may occur to others upon a reading and understanding of this description. It is to be understood that all such modifications and alterations are included in the scope of the invention as set forth in the appended claims, or the equivalents thereof.

What is claimed is:

1. A tire for sand traction, comprising:
a ground-engaging tread disposed radially outwardly of a wheel;
structural elements extending radially between the wheel and the tread;
the tread including a continuous circumferentially-extending inboard shoulder and a continuous circumferentially-extending outboard shoulder;
the tread being formed with a circumferentially-extending recess wall extending laterally between the inboard shoulder and the outboard shoulder, wherein the recess wall is disposed radially inwardly of the inboard shoulder and the outboard shoulder to form a circumferentially-extending central recess; and
a plurality of circumferentially-spaced laterally-extending lugs, wherein each lug extends across the central recess from the inboard shoulder to the outboard shoulder, the lugs being disposed between and not over the inboard shoulder and the outboard shoulder, each lug including a radially outer surface being disposed radially inwardly of a radially outer surface of the inboard shoulder and a radially outer surface of the outboard shoulder.

2. The tire for sand traction of claim 1, wherein the inboard shoulder and the outboard shoulder are each formed with a smooth surface.

3. The tire for sand traction of claim 1, wherein the recess wall is formed with a smooth surface.

4. The tire for sand traction of claim 1, further comprising an inboard transition formed between the inboard shoulder and the recess wall.

5. The tire for sand traction of claim 4, further comprising an outboard transition formed between the outboard shoulder and the recess wall.

6. The tire for sand traction of claim 5, wherein a radius of the inboard transition is equal to a radius of the outboard transition.

7. The tire for sand traction of claim 1, wherein the lugs are spaced from about three inches to about ten inches apart about the circumference of the tire.

8. The tire for sand traction of claim 1, wherein each lug of the plurality of lugs is integrally formed with the recess wall.

9. The tire for sand traction of claim 1, wherein each lug of the plurality of lugs is formed with a thickness that tapers as each lug extends radially outwardly.

10. The tire for sand traction of claim 9, wherein the thickness of each lug of the plurality of lugs is about one-half of an inch at the recess wall and about one-quarter of an inch at a radially outer lug surface.

11. The tire for sand traction of claim 1, wherein the tire is a pneumatic tire and the structural elements are sidewalls that cooperate with the tread and the wheel to form a cavity which is inflated with pressurized air.

12. The tire for sand traction of claim 1, wherein the tire is a non-pneumatic tire and the structural elements include a system of at least one of spokes and webbing to support the tread.

13. The tire for sand traction of claim 1, wherein the inboard shoulder tapers radially inwardly as it extends in an outboard direction, and the outboard shoulder tapers radially inwardly as it extends in an inboard direction.

14. The tire for sand traction of claim 13, wherein an angle of each taper is from about one degree to about 10 degrees.

15. The tire for sand traction of claim 14, wherein the angle of each taper is about five degrees.

16. The tire for sand traction of claim 1, wherein each lug is formed with a straight lateral configuration.

17. The tire for sand traction of claim 1, wherein each lug is formed with a curved lateral configuration.

18. The tire for sand traction of claim 1, further comprising at least one rib formed on the recess wall and extending circumferentially about the tread.

19. The tire for sand traction of claim 1, wherein a maximum radial height of each lug is from about one inch to about three inches.

* * * * *